(12) United States Patent
Caldato et al.

(10) Patent No.: US 6,665,435 B1
(45) Date of Patent: Dec. 16, 2003

(54) IMAGE DATA PROCESSING METHOD AND CORRESPONDING DEVICE

(75) Inventors: Claudio Caldato, Bergamo (IT); Andrea Monaci, Bergamo (IT); Douglas Heins, Burley, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/395,926

(22) Filed: Sep. 14, 1999

(30) Foreign Application Priority Data

Sep. 22, 1998 (EP) .............................. 98203197

(51) Int. Cl.[7] ................................. G06K 9/36
(52) U.S. Cl. ................... 382/166; 382/276; 382/302; 358/518
(58) Field of Search ................................ 382/162, 276, 382/282, 283, 166, 172, 302, 303, 304; 358/109, 504, 518; 348/418, 405, 558, 557, 560, 566, 661

(56) References Cited

U.S. PATENT DOCUMENTS

| | | | |
|---|---|---|---|
| 5,243,447 A | | 9/1993 | Bodenkamp et al. |
| 5,502,642 A | | 3/1996 | Dichter |
| 5,530,798 A | | 6/1996 | Chu et al. |
| 5,640,198 A | * | 6/1997 | Makiyama et al. ...... 348/14.09 |
| 5,883,979 A | * | 3/1999 | Beretta et al. .............. 382/251 |
| 5,982,937 A | * | 11/1999 | Accad ........................ 382/239 |
| 5,999,644 A | * | 12/1999 | Sugiura ...................... 382/162 |
| 6,321,266 B1 | * | 11/2001 | Yokomizo et al. .......... 358/400 |
| 6,324,305 B1 | * | 11/2001 | Holladay et al. ........... 382/239 |

FOREIGN PATENT DOCUMENTS

| | | |
|---|---|---|
| EP | 0660580 | 6/1995 |
| EP | 0665679 | 8/1995 |

OTHER PUBLICATIONS

European Search Report for EP98203197 dated Mar. 5, 1999 by Examiner Gonzalez Ordonez, O.

* cited by examiner

Primary Examiner—Bhavesh M. Mehta
Assistant Examiner—Ali Bayat

(57) ABSTRACT

The invention relates to an image data processing method receiving an input image data split in elementary units of information and providing an output image data with a particular image format depending on the requirements of a final device that receives such output image data by means of the following steps: identification of the final device that receives the output data; getting an input image data; from a repository of basic imaging operation, selecting a plurality of operations to be performed on the input image data; creating a sequence of operations that links and ordinate the plurality of operations; applying the sequence to the input image data to create a plurality of layers of organized data of said input image data; assembling said plurality of layers into at least an output layer which best fit the requirements of the identified final device; and sending the assembled output layer to the identified final device. The invention also relates to a configurable image processing device to read and output an image data in accord with a particular output format depending on a final device that receives the output image data.

14 Claims, 12 Drawing Sheets

OR

IMAGE DATA PROCESSING METHOD AND CORRESPONDING DEVICE

FIELD OF THE INVENTION

The present invention relates to a processing method and, more particularly, to an image data processing method receiving an input image data splitted into elementary unit of information to be used in embedded applications.

The present invention also relates to an image data processing device implementing such image data processing method.

BACKGROUND OF THE INVENTION

As is well known in the technical field of image processing, during its life an image is processed by a plurality of electronic devices, that create, acquire, display store, read and write the image itself.

The image data processing device, and the corresponding processing method deal with an image acquired by means of an image acquisition device, for example a scanner.

The image data so obtained are usually organized into a raster of pixels, each pixels providing an elementary image information.

In other words, images are, at the most basic level, arrays of digital values, where a value is a collection of numbers describing the attributes of a pixel in the image. For example, in bitmaps, the above mentioned values are single binary digits.

Often, these numbers are fixed-point representation of a range of real number; for example, the integers 0 through 255 are often used to represent the numbers from 0.0 to 1.0. Often too, these numbers represent the intensity at a point of the image (gray scale) or the intensity of one color component at that point.

An important distinction has to be made in the images to be processed between achromatic and colored images.

In fact, achromatic light has only one attribute, which is the quantity of light. This attribute can be discussed in the physic sense of energy, in which case the terms intensity and luminance are used, or in the psychological sense of perceived intensity, in which case the term brightness is used.

It is useful to associate a scale with different intensity levels, for instance defining 0 as black and 1 as white; intensity levels between 0 and 1 represent different levels of grays.

The visual sensations caused by colored light are much more richer than those caused by achromatic light. Discussion on color perception usually involves three quantities, known as: hue, saturation and lightness.

1. Hue distinguishes among colors such as red, green, purple and yellow.

2. Saturation refers to how far a color is from a gray of equal intensity. Red is highly saturated; pink is relatively unsaturated; royal blue is highly saturated; sky blue is relatively unsaturated. Pastel colors are relatively unsaturated; unsaturated colors include more white light than do the vivid, saturated colors.

3. Lightness embodies the achromatic notion of perceived intensity of a reflecting object.

A fourth term, brightness, is used instead of lightness to refer to the perceived intensity of a self-luminous object (i.e. an object emitting rather than reflecting light), such as a light bulb, the sun or a CRT.

The above mentioned features of colors seem to be subjective: they depend on human observers' judgment. In reality, the branch of physics known as colorimetry provides for an objective and quantitative way of specifying colors, which can be correlated to the above perceptual classification.

A color can be represented by means of its dominant wavelength, which corresponds to the perceptual notion of hue; excitation purity corresponds to the saturation of the color; luminance is the amount or intensity of light. The excitation purity of a colored light is the proportion of pure light of the dominant wavelength and of white light needed to define the color.

A completely pure color is 100% saturated and thus contains no white light, whereas mixtures of a pure color and white light have saturations somewhere between 0 and 100%. White light and hence gray are 0% saturated, contains no color of any dominant wavelength.

Furthermore, light is fundamentally electromagnetic energy in the 400–700 nm wavelength part of the spectrum, which is perceived as the colors from violet through indigo, blue, green, yellow and orange to red. The amount of energy present at each wavelength is represented by a spectral energy distribution $P(1)$, as shown in FIG. 1.

The visual effect of any spectral distribution can be described by means of three values, i.e. the dominant wavelength, the excitation purity, and the luminance. FIG. 2 shows the spectral distribution of FIG. 1, illustrating such three value. In particular, it should be noted that at the dominant wavelength there is a spike of energy of level $e2$. White light, the uniform distribution of energy level $e1$ is also present.

The excitation purity depends on the relation between $e1$ and $e2$: when $e1=e2$, excitation purity is 0%; when $e1=0$, excitation purity is 100%.

Luminance, which is proportional to the integral of the area under such curve, depends on both $e1$ and $e2$.

A color model is a specification of a 3D color coordinate system and a visible subset in the coordinate system within which all colors in a particular range lie. For instance, the RGB (red, green, blue) color model is the unit cube subset of a 3D Cartesian coordinate system, as shown in FIG. 3.

More specifically, three hardware-oriented color models are RGB, used with color CRT monitors, YIQ, i.e. the broadcast TV color system that is a re-coding of RGB transmission efficiency and for downward compatibility with black and white television and CMY (cyan, magenta, yellow) for some color-printing devices. Unfortunately none of these models are particularly easy to use because they do not relate directly to intuitive color notions of hue, saturation, and brightness. Therefore, another class of models has been developed with ease of use as a goal, such as the HSV (hue, saturation, value)—sometimes called HSB (hue, saturation, brightness), HLS (hue, lightness, saturation) and HVC (hue, value, chroma) models.

With each model is also given a means of converting to some other specification.

As stated above, the RGB color model used in color CRT monitors and color raster graphics employs a Cartesian coordinate system. The RGB primaries are additive primaries; that is the individual contributions of each primary are added together to yield the result. The main diagonal of the cube, with equal amounts of each primary, represents the gray levels: black is (0,0,0); white is (1,1,1).

Following such gray line implies the change of the three Cartesian value R, G and B at the same time, as shown with a point-dotted line in FIG. 4A; this situation weights the computational charge of the image processing steps requiring the individuation of gray regions.

The RGB model is hardware-oriented. By contrast HSV (as well as HSB or HLC) model is user-oriented, being based on the intuitive appeal of the artist's tint, shade, and tone. The coordinate system is cylindrical, as shown in FIG. 4B.

The HSV model (like the HLC model) is easy to use. The grays all have S=0 and they can be removed from an image data raster by means of a cylindrical filter in proximity of the V axes, as shown in FIG. 5; moreover, the maximally saturated hues are at S=1, L=0.5.

The HLS color model is a reduced model obtained from the HSV cylindrical model, as shown in FIG. 6; the reduction of the color space is due to the fact that some colors cannot be saturated. Such space subset is defined is a hexcone or six-sided pyramid, as shown in FIG. 7. The top of the hexcone corresponds to V=1 which contains the relatively bright colors. The colors of the V=1 plane are not all of the same perceived brightness however.

Hue or H, is measured by the angle around the vertical axis with red at 0° green at 120° and so on (see FIG. 7), Complementary colors in the HSV hexcone are 180° opposite one another. The value of S is a ratio ranging from 0 on the center line (V axis) to 1 on the triangular sides of the hexcone.

The hexcone is one unit high in V, with the apex at the origin. The point at the apex is black and has a V coordinate of 0. At this point, the values of H and S are irrelevant. The point S=0, V=1 is white. Intermediate values of V or S=0 (on the center line) are the grays. It is therefore immediately apparent the simplicity of use of the HSV or equivalent color space in order to obtain the gray regions.

Adding a white pigment corresponds to decreasing S (without changing V). Shades are created by keeping S=1 and decreasing V. Tones are created by decreasing both S and V. Of course, changing H corresponds to selecting the pure pigment with which to start. Thus, H, S, and V correspond to concepts from the perceptive color system.

The top of the HSV hexcone corresponds to the projection seen by looking along the principal diagonal of the RGB color cube from white toward black, as shown in FIG. 8.

In FIG. 9 is shown the HLS color model, which is defined in a double-hexcone subset of the cylindrical space. Hue is the angle around the vertical axis of the double hexcone, with red at 0°. The colors occur around the perimeter: red, yellow, green, cyan, blue and magenta. The HLS space can be considered as a deformation of HSV space, in which white is pulled upward to form the upper hexcone from the V=1 plane. As with the single-hexcone model, the complement of any hue is located 180° farther around the double hexcone, and saturation is measured radially from the vertical axis form 0 on the axis to 1 on the surface. Lightness is 0 for black (at the lower tip of the double hexcone) to 1 for white (at the upper tip).

Many hardware and software packages are currently available in the technical field of the electronic image processing which provide for image data processing methods and corresponding devices. However, it should be noted that the Applicant is not aware of any package capable of operating in both the personal computer/work station field as well as in the embedded devices field.

In fact, the embedded devices have a plurality of needs which turn into tight limitations for the image processing devices themselves. Particularly, the image processing in an embedded environment seeks:

to reduce the size of the image data in order to limit the memory area employed by the image data processing devices;

to increase the amount of any text portion comprised in a document that can be OCR'able, i.e. it should be possible to acquire and understand such portion by means of an Optical Characters Recognitor (OCR);

to get as final result of the image data processing device an image viewable and printable, which is close to the original acquired image.

Known document analysis that tried to fit the above requirements have the problem of being computationally very heavy and not suited for embedded applications where processing power and memory requirements are stringent and important.

So, even if these solutions may perform an acceptable analysis of the document, they are not applicable in an embedded environment.

The main purpose of the known document analysis is the extraction of features and the classification of text and images in the analyzed documents. Examples of analysis used in this technical field are known from the publication "Document Image Analysis" to L. O'Gorman and R. Kasturi, IEEE Computer Society Press, which is a collection of all the most relevant papers regarding document analysis.

All the known approaches deal with the recognition of different types of areas on a page. The areas are normally classified into regions of text, photo and line art. The page is then divided into these different areas (normally in a mutually exclusive way) and each is treated in a different way. In other terms, the known document analysis deal with understanding the "type" of information that is on the page.

These solutions tend to sub-divide the page into mutually exclusive regions that contain different type of information.

Other known devices deal with decomposed documents, i.e. documents translated into a plurality of elementary image information called pixels. Such devices provide a treatment of the decomposed document as a whole, or at least are able to reconstruct the information they need from the input document format.

An illustrative and not limiting example is a BW fax machine. If such device can deal only with BW data and the document contains a mixture of sparse color and BW data, the fax machine image processing device must be able to reconstruct a single BW page from the pieces of the decomposed original document.

A known way to comply with the embedded environment requirements leads to peripheral devices that support only the specified features of a particular product; that is how cost and performance are satisfied.

An object of the present invention is to teach how to build into the system the necessary architecture which allows for image processing functionality not fixed or predetermined a priori. In this way, the functionality is not static and can be altered just like a program running on a personal computer or on a work station.

Starting from the image processing devices basic requirements, several known solution packages propose a "plug and play" capability of components. Unfortunately, these known solutions do not offer the speed or flexibility in order to operate within an embedded environment.

Moreover, all of the known processing devices suffer large execution footprints, large memory needs, and a code data space that exceeds the ties of the embedded application.

So, another object of the present invention is that of figuring how to provide the same level of user configurability and customization, without violating the strict requirements of the embedded market.

SUMMARY OF THE INVENTION

The solution idea behind this invention is that of isolating the means whereon data are transported around the system.

More particularly, the present invention describe a dynamic image data processing pipeline which is distributed in a transparent fashion, not influencing any other component within the system using the processing device according to the present invention.

It should be noted that, unlike a series of plugs components or a series of small executables that are chained together to form the pipeline, the present solution focuses in making small atomic operations that function independent of any context.

According to this solution idea, the invention relates to an image data processing method as defined in the enclosed claim 1.

The invention also relates to an image data processing device, implementing such method, as defined in the enclosed claim 12.

The features and advantages of the image data processing method and device according to the invention will be appreciated by the following description of a preferred embodiment given by way of non-limiting examples with reference to the annexed drawings.

DETAILED DESCRIPTION OF THE INVENTION

The basic idea underlying the present application is that of providing a processing method reducing the complexity of image processing in an undetermined fashion. The idea provides also for implementing a corresponding configurable plug-&-playable embedded firmware solution.

The image data processing method according to the present invention comprises the following steps:
1. Identification of a final device which receives the output data, in terms of its requirements.
2. Get a color image input data a pixels raster format.
3. Select a group of basic operations to be performed on said image data.
4. Create a sequence that links and ordinate said basic operations.
5. Apply the above predetermined sequence to the input image data.
6. Create a plurality of layers of organized meta-level data.
7. Assemble at least an output layer which is optimal for the identified device.
8. Send each assembled output layer to the identified device.

Examples of final devices may be printers, copiers, image systems, office applications (such as, word processors, spreadsheet, . . . ), facsimiles, OCR applications, PDF applications or the like.

Each of these final devices has specific requirements. For example, high resolution data having no color information are required in order to perform an OCR function; instead, such color information should be contained in an output image data for a color printer. It should be noted that in the above steps 3 to 5 each sequence yields to an unique result. Moreover, the steps 6 and 7 specify, for each layer, which kind of data to process and how to process such data. Finally, step 9 creates an output layer in the specific format required by the identified device.

Figure 1:
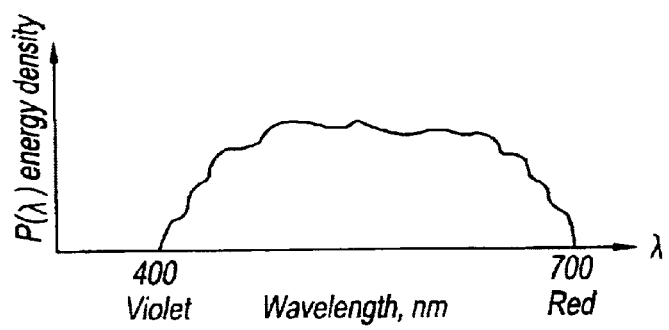
FIG. 1 shows an example of a spectral energy distribution of a color.
Figure 2:
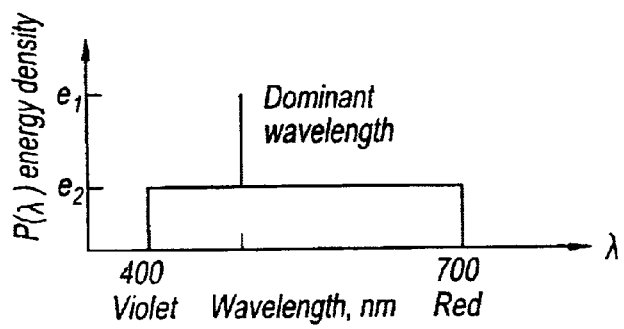
FIG. 2 shows the spectral distribution of FIG. 1, illustrating dominant wavelength, excitation purity and luminance.
Figure 3:
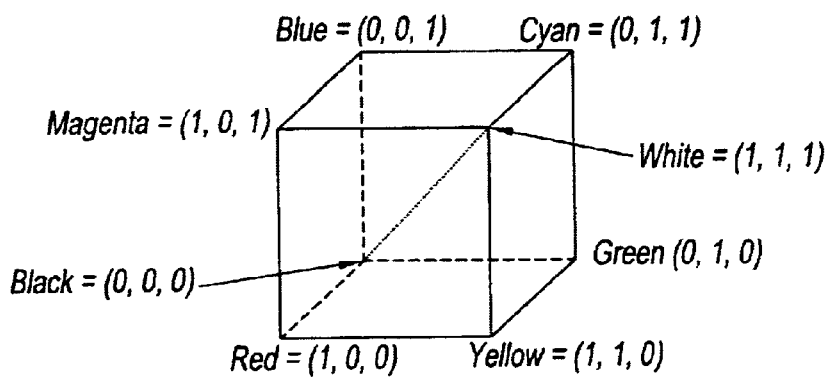
FIG. 3 shows the 3D Cartesian representation of the RGB color space, with the fundamental colors.
Figure 4A:
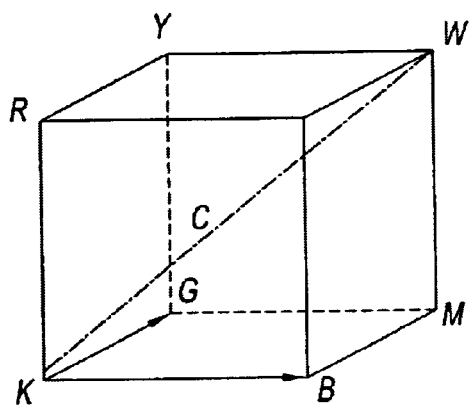
FIG. 4A shows the RGB color space of FIG. 3 and the gray line within.
Figure 4B:
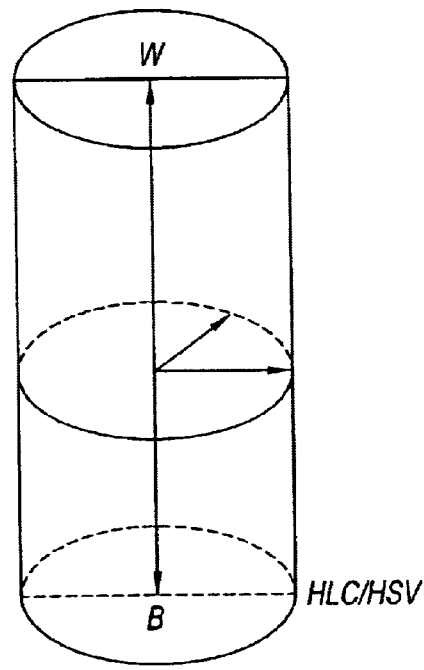
FIG. 4B shows the cylindrical representation of the HSV/HLC color space.
Figure 5:
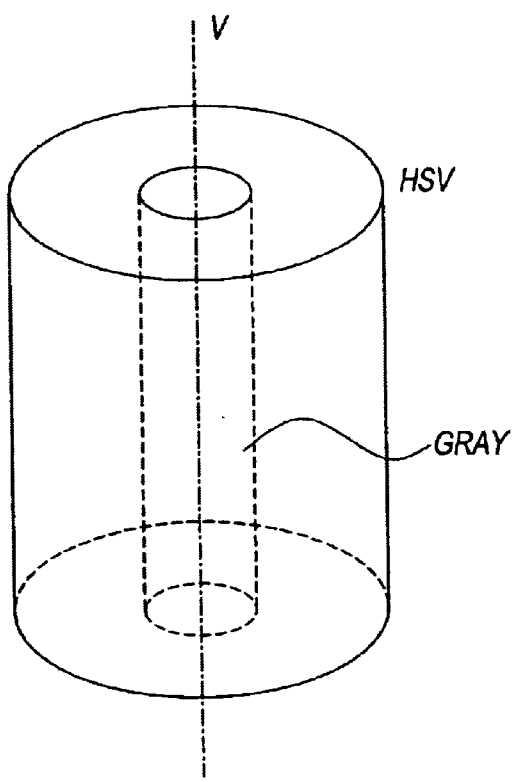
FIG. 5 shows a gray filter for the HSV/HLC color space.
Figure 6:
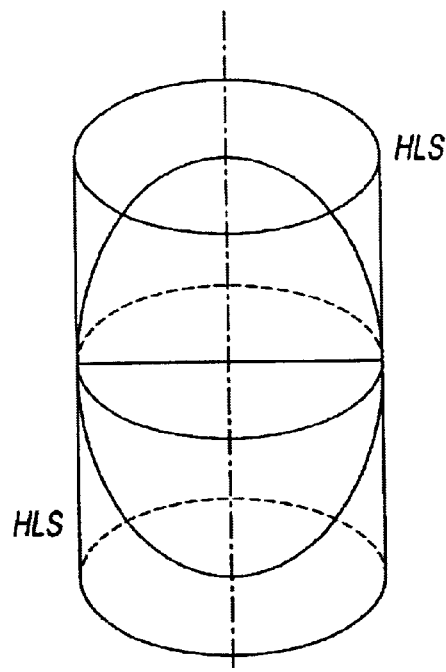
FIG. 6 shows the HLS color space.
Figure 7:
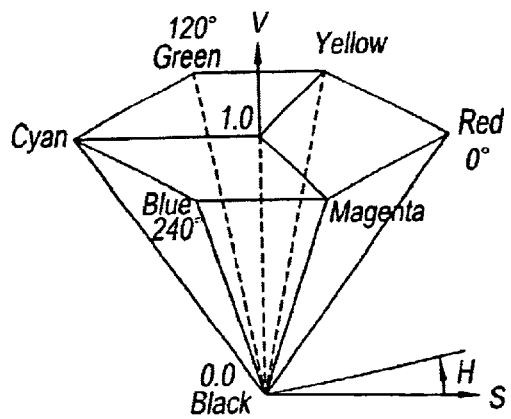
FIG. 7 shows the single-hexcone representation of HSV color space.
Figure 8:
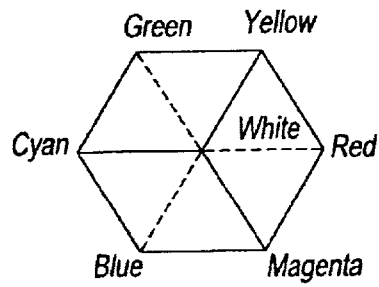
FIG. 8 shows a section of FIG. 7.
Figure 9:
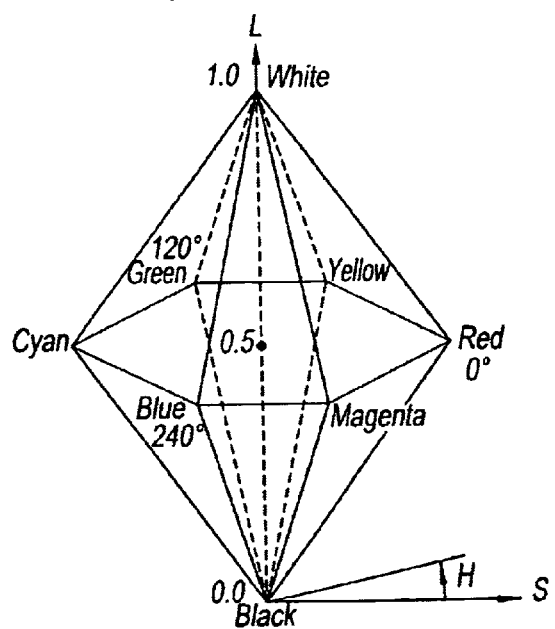
FIG. 9 shows the double-hexcone representation of the HSV color space.
Figure 10:
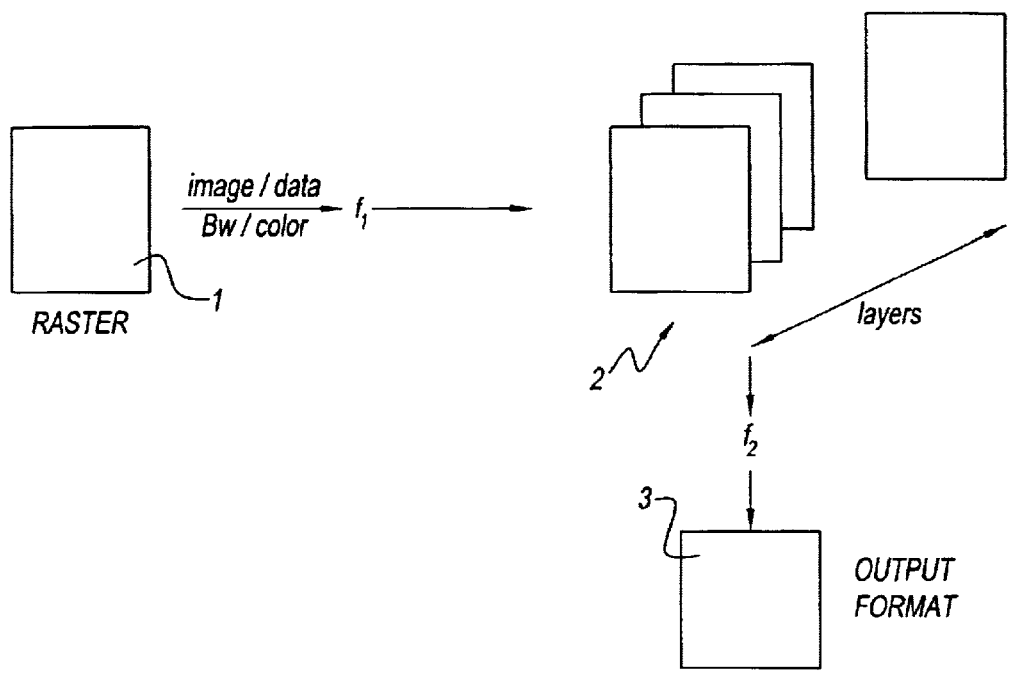
FIG. 10 shows schematically the image processing method according to the present invention.

In other terms, the processing method according to the present invention provide a plurality of basic functions for the digital image pixels and the combination between such functions in order to obtain the desired layer, as shown in FIG. 10.

According to this figure, an input data 1, having, for example, the form of a raster of pixels, is processed according to a first function f1 in order to obtain a plurality of layers 2, corresponding to different representations of the processed image data.

Moreover, the method according to the present invention comprises a second function f2 that select/create the desired format for the output data 3.

Figure 11:
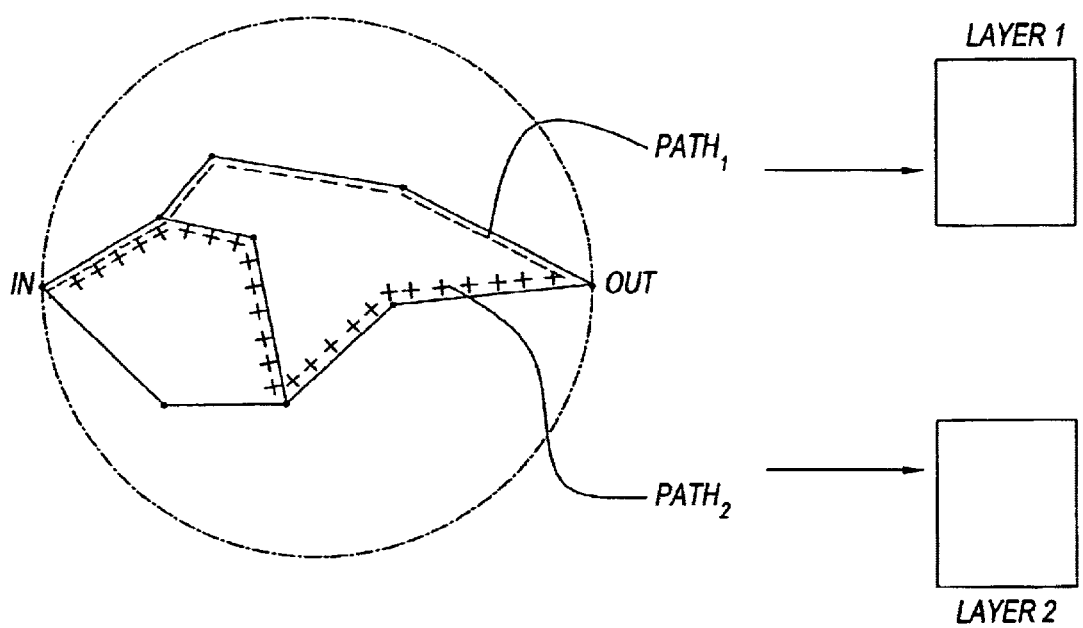
FIG. 11 shows schematically examples of path for the method according to the present invention.

FIG. 11 shows schematically examples for image data paths according to the proposed image data processing method. Particularly, in FIG. 11 the method according to the present invention is shown in terms of pipelines 4, i.e. in term of "paths" of atomic operations to be performed on the input data 1 in order to obtain a particular output format 3. More particularly, FIG. 11 shows two different output representation, LAYER1 and LAYER2, obtained by means of a first, PATH1, and a second data path, PATH2.

Image based segmentation and analysis involves the classification of unique data features in input data. This data is viewed and processed as separate entities, without any relationship between the features and the input image being maintained.

The present invention expands upon the traditional processing viewpoint of image segmentation through the introduction of meta-level representation that corresponds to the relationship between layers. Layers become a logical meta-level viewport or window into the input data.

For example, a single input data source contains all content for the image, but carries no meta-level information as to how that data can be extracted, viewed or manipulated. For example, if the input image is requested for OCR'able content, the baseline image is incapable of delivering the data necessary for the OCR engine. If the input image is requested for color image data content, the baseline input image is unable to extract the necessary information that conveys the image content only. This knowledge is traditionally maintained in the algorithms or hard coded application; it is not flexible and independent of the application itself.

Indeed, layers carry a cognitive or meta-level knowledge that allows for the mapping mechanism necessary to create and generate the proper data view required by each layer. This concept moves from a single flat raster view to a rich multi-layer view where each layer has a different perspective upon the underlying baseline layer, and can be processed independent or dependent upon other layers. These layers can be defined to process output optimal for a destination device if so designed and specified.

Take for example the process of creating two overlapping images from a single flat raster structure. One could conceive of a requirement where image content that is monochrome is to be processed mutually exclusive of image content that is color. Furthermore, the two different images are to be processed with different resolutions, pixel bit depth, compression methods, to mention a few. Traditional methods would separate the two processes, generating different intermediates, and later figuring out how to combine and weave the intermediates into a single artefact for some destination or other purpose.

With layers, one can conceive a meta-level view that sees the flat input raster image one of the components of a 5 layer representation. The first layer is the baseline input source image. The second layer is the knowledge necessary to create the perspective of monochrome content only. The third layer is the meta-level information necessary to create the view for color data content. The fourth layer contains the knowledge for the relationship between layers 2 & 3 and how they are related mutually exclusive of each other. The final layer captures the perspective of how the data is extracted from each appropriate layer to create the final representation optimal for the output device.

This differs from traditional means, whom view the source data as a flat structure and the relationship between data is captured in the application or hardcoded into a specific algorithm. Given layers, into the baseline flat image source data, one can extract any given portion of a layer. From layers, one can obtain meaningful content that may or may not have any resemblance to the original source, but has meta-level connection between the layers that create the final perspective for how that data is to be processed and represented at the output destination in a flexible fashion.

The pipelines or paths define the sequence of atomic operations to be performed on the input image data 1. Such atomic operations, which are individually known in the field of image data processing, can be grouped together to generate a plurality of IP (Image Processing) tools.

The IP tools comprise:

a transformation of an image pixel from the RGB format to another image space format, for example the HLS (or HLN, for hue, lightness, chroma indicator N) format;

a grouping function that associates elementary unit of information in order to obtain an unique information group to be processed, as the blobbing technique;

scalars processes that change the image dimensions;

a down sampling function;

a thresholding function;

a split and merge data function;

encoder functions;

an AND/OR and other data extraction function;

compression functions (for example, the G4 or JPEG compression method);

a half-tone approximation;

data format readers and writers;

a re-mapping or stretching function;

a filtering function.

Figure 12A:
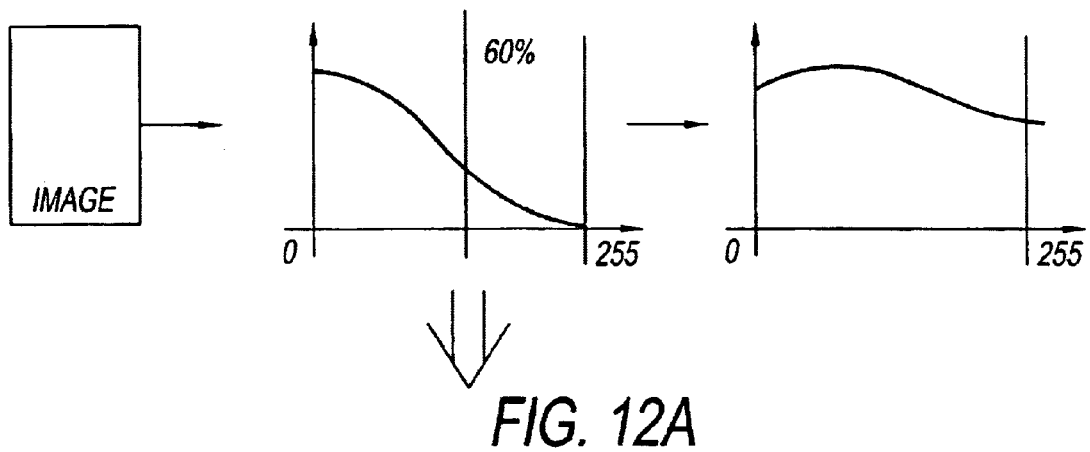
FIGS. 12A, 12B and 12C show an example of atomic operation used in the method according to the present invention and its implementation.

In FIG. 12A is shown the image process of re-mapping, highly used in the field of photos processing. Since the content of data of an image histogram is usually concentrated approximately in the first 60% portion of such image histogram, the information contained in such portion are distributed or re-scaled over the all image data space in order to increase the useful information data.

Figure 12B:
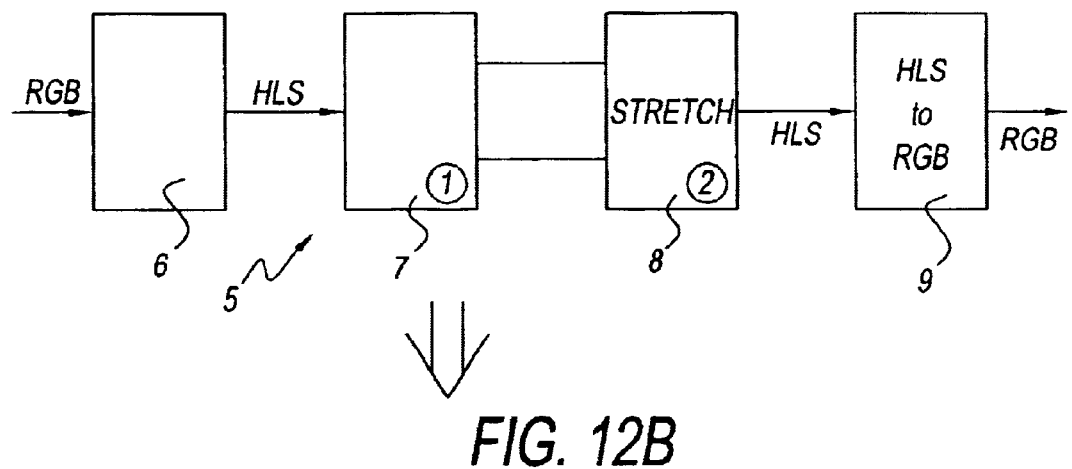

FIG. 12B shows schematically an implementation of the above re-mapping process, called re-mapping architecture 5. The re-mapping architecture 5 comprises a RGB to HLS converter 6, connected to an HLS to RGB converter 9, by means of a series of an HLS filter 7 and a stretch block 8.

Figure 12C:
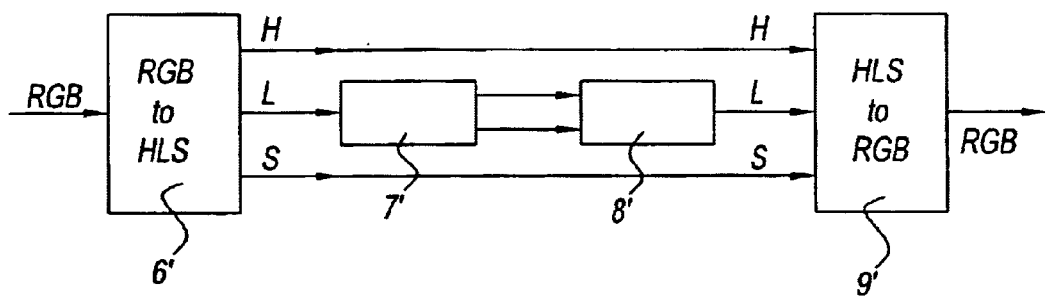

More precisely, the re-mapping process deals only with the L channel, i.e. the lightness information, as shown in FIG. 12C, in which a re-mapping architecture 5' comprises a RGB to HLS converter 6' having an H, L, and S output channels. The L channel is connected to series of an HLS filter 7' and a stretch block 8'. The re-mapping architecture 5' further comprises an HLS to RGB converter 9' receiving the H and S channel as outputted from the RGB to HLS converter 6' and the L channel as processed by means of the HLS filter 7' and the stretch block 8'.

Figure 13A:
FIGS. 13A, 13B and 13C show another example of atomic operation used in the method according to the present invention and its result.
Figure 13B:
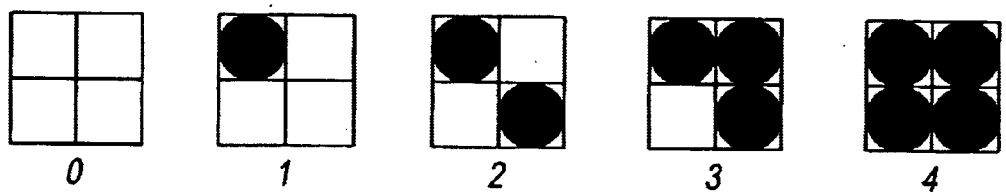
Figure 13C:

The halftone approximation is shown in FIGS. 13A to 13C. It is pointed out that many displays and hardcopy devices are bilevel—they produce just two intensity levels— and even 2- or 3-bit-per-pixel raster displays produce fewer intensity levels than desired. The range of available intensities can be expanded on the basis of the spatial integration that human's eyes perform. If anyone views a very small area from a sufficiently large viewing distance, his eyes average fine detail within the small area and record only the overall intensity of the area.

This phenomenon is exploited in printing black-and-white photographs in newspapers, magazines, and books, in the technique called halftoning (also called "cluster-dot ordered dither" in computer graphics). Each small resolution unit is imprinted with a circle of black ink whose area is proportional to the blackness 1–I (where I is the intensity) of the area in the original photograph. FIG. 13A shows part of a halftone pattern, greatly enlarged. Note that the pattern makes a 45° angle with the horizontal, called the screen angle.

Graphics output devices can approximate the variable-area circles of halftone reproduction. For example, a 2*2 pixel area of a bilevel display can be used to produce five different intensity levels at the cost of halving the spatial resolution along each axis. The patterns shown in FIG. 13B can be used to fill the 2*2 areas with the number of ON pixel that is proportional to the desired intensity. FIG. 13C shows a face digitized as a 351*351 image array and displayed with 2*2 patterns.

Figure 14A:
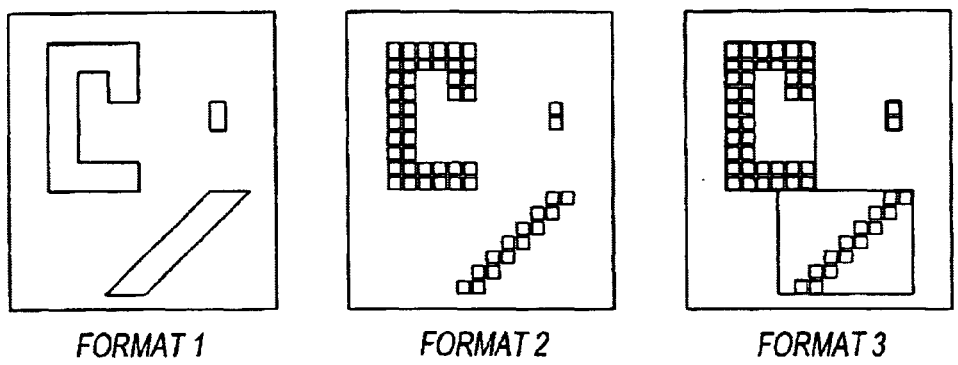
FIGS. 14A, 14B and 14C show another example of atomic operation used in the method according to the present invention and its implementation.

Another image data processing comprises a down sampling and thresholding of the data. In particular, as shown in FIG. 14A, once the colorfulness of each pixel has been calculated and extracted from the input data (FORMAT 1), the image data are down sampled.

The down sampling algorithm can be performed in various ways that all have a different effect on the performance of the algorithm. If down sampling by taking the average value in a neighborhood is used, a lot of document (small regions of color due to the printing process for e.g.) and scanner noise (jitter on the RGB signal) can be eliminated.

More generally, an up/down sampling algorithm, which raise/reduce the image dimensions, can be used.

The down sampled image data are then selected by means of a threshold, so obtaining an image having a pixels format without the spike noise (FORMAT 2). In fact, the output data are considered ON if colorfulness of the input image pixel is above the threshold and OFF if it is lower than the threshold.

The simplest case consists in applying a fixed threshold. The output of this stage is a down sampled version of the original image that has ON pixels in those regions where the color content of the original image were above the color threshold. Moreover, a rule for the colorfulness indicator can be considered. For example, evaluating the ON/OFF states of a particular pixel PX as well as the right RP and left pixel LP, the following rule can be applied:

| left pixel LP | pixel PX | right pixel RP | result |
| --- | --- | --- | --- |
| ON | ON | ON | colorfull |
| OFF | OFF | OFF | no color. |

Moreover, different threshold values can be considered with reference to different final devices.

For example, a low resolution display does not need to receive a 16 billion color image data, since such device have no possibility of elaborating and displaying this kind of complex image data. An image data forwarded to a low resolution display can be obtained by means of particular thresholding values by limiting the number of available colors, e.g. filtering pale colors and transforming then into white or "clustering" different type of "reds" in order to have only one "red".

An example of an acceptable range for the threshold values is 0 to 30 for an input image data of 0 to 255.

The more complex case accumulates a histogram of the color content of the page and, using a heuristic, decides what the best threshold for the page is.

The color information of single small groups of pixels can be further grouped together using known simple grouping techniques. The grouping step is performed on data of connected components, as shown in FIG. 14A (FORMAT 3). This has the advantage of grouping regions of pixels that are considered colorful into bigger group. In this way, when the regions of colorful pixels are compressed (in a later stage), not every pixel has to be compressed singularly. The compression of a larger group of pixels is more efficient than the singular compression of each single colorful region.

The grouping of pixels also has the advantage of enabling the elimination of small groups of pixels that are still considered to be due to noise, or in any case, of insignificant size.

Figure 14B:
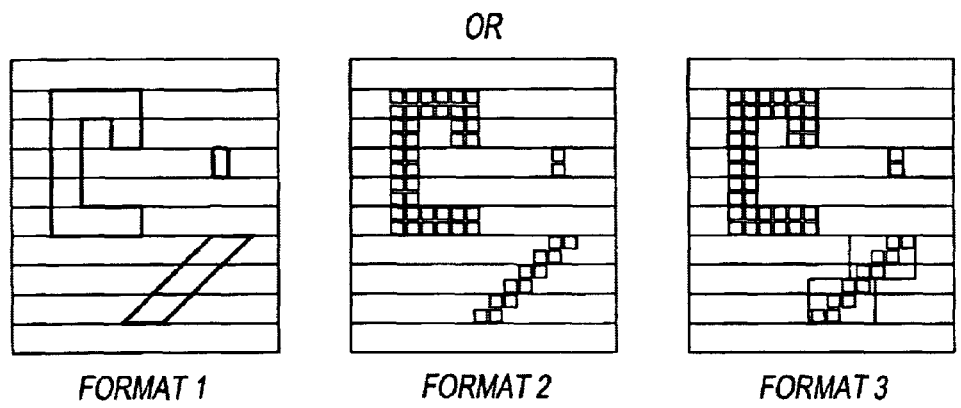
Figure 15:
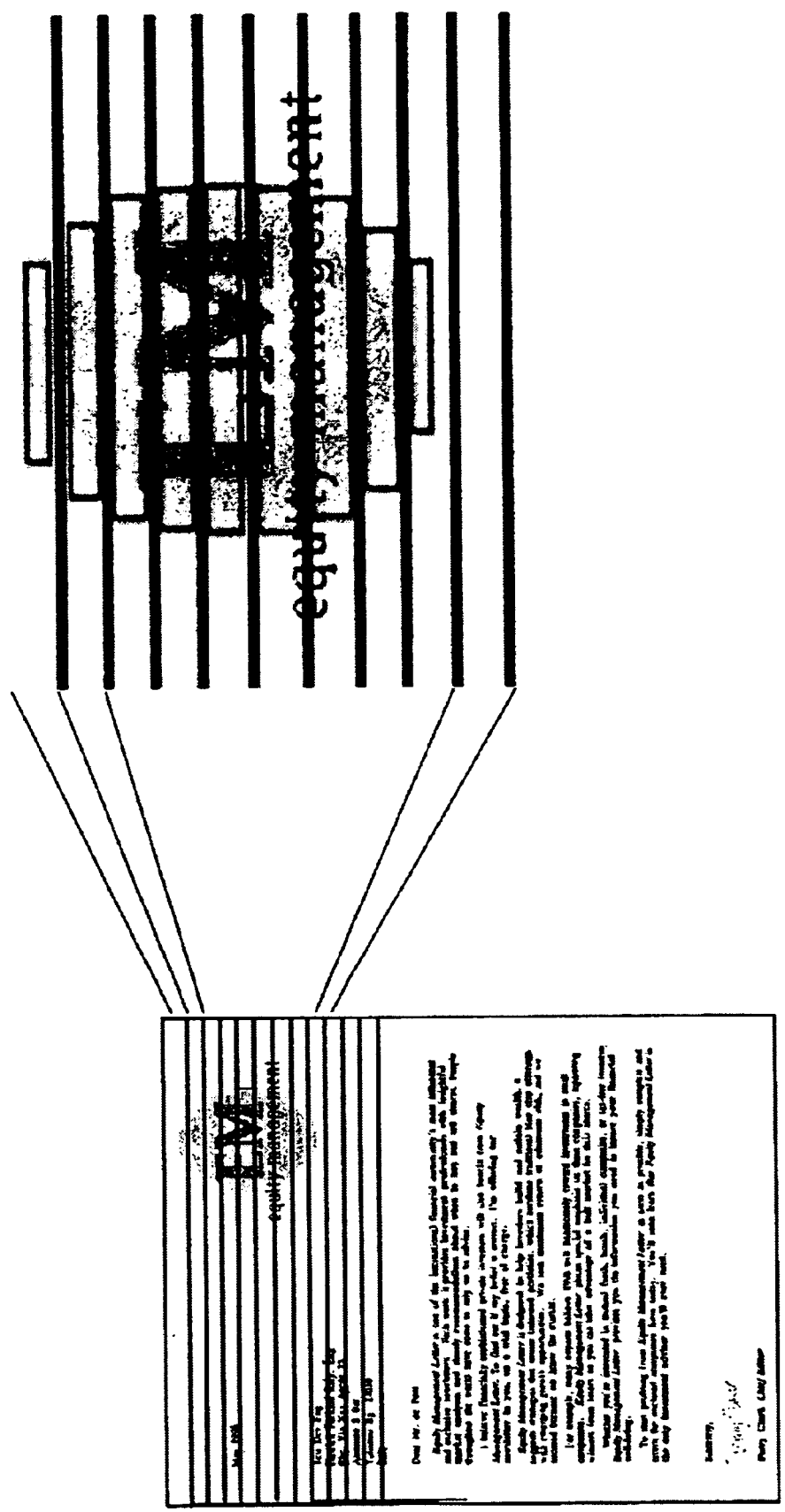
FIG. 15 shows a particular result for the atomic operation of FIGS. 14A, 14B and 14C.

The whole procedure that has been depicted can also be performed on a strip basis on the whole original image, without any modification, as shown in FIG. 14B. Strip based analysis produces a nice side effect on the grouping of pixels. In fact, if the grouping of pixels is performed on a strip basis, the grouping of pixels enables an approximation of the contour of colored regions, as shown in FIG. 15.

Figure 14C:
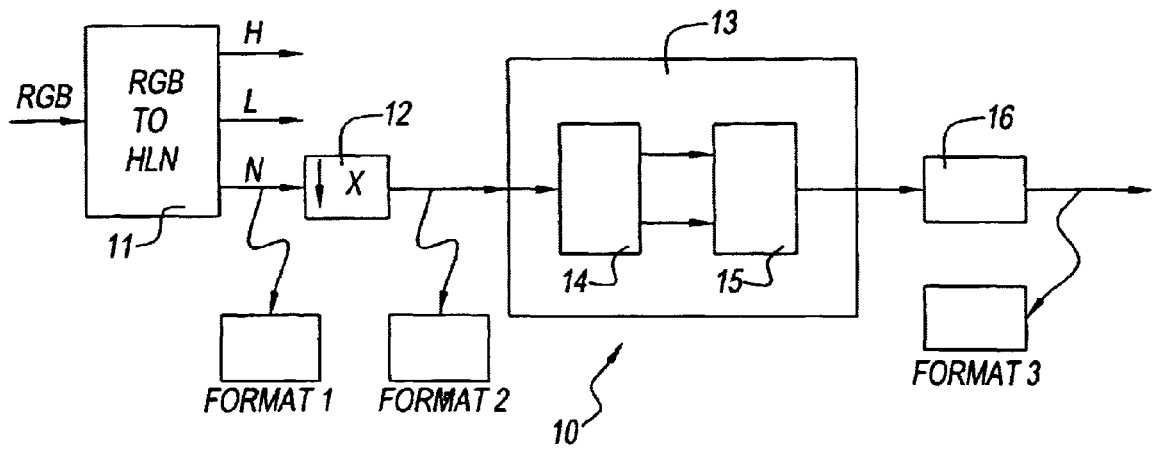

FIG. 14C shows a down sampling/thresholding/grouping device 10. The first component is an RGB to Chroma space converter 11. It converts, on a pixel by pixel basis, the color representation of every input pixel into a different color space representation.

When the aim is making decisions on the colorfulness of a pixel, using the right color space representation is important.

The RGB color space has been found not very convenient for this type of analysis. The color space used should have an indication of the colorfulness of the specific pixel. The HLN (Hue/Lightness/N??) color space was found particularly convenient and is used in the current realization.

The indication of Chroma, in this HLN color space, is directly the content of the N channel, where N=max (R,G, B)−min (R,G,B).

The down sampling/thresholding/grouping device 10 further comprises a down sampler 12, that down samples the N channel, and a thresholding device 13, in turn comprising a threshold selector 14 and a look-up-table LUT 15 which apply a threshold to the down sampled data.

The output data is considered ON if colorfulness of the input image pixel is above the threshold and OFF if it is lower than the threshold.

Moreover, the color information of single small groups of pixels can be further grouped together by means of a grouping block 16, using known simple grouping techniques on data of connected components, in order to improve the compression of the image data and eliminate small groups of pixels that are still considered to be due to noise, or in any case, of insignificant size.

It should be noted that a HLS to RGB converter (not shown in FIG. 14C) can also be added to the down sampling/ thresholding/grouping device 10 in order to obtain RGB output data.

Figure 16:
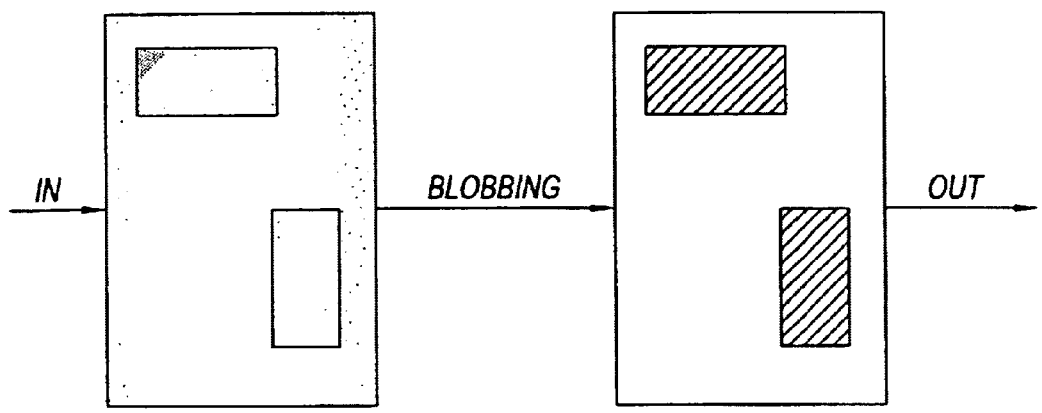
FIG. 16 shows another example of atomic operation used in the method according to the present invention.

A simple grouping procedure called blobbing can be used in order to extract the images from a document, as shown in FIG. 16, where the blobbed regions should correspond to the images of the document.

Figure 17:
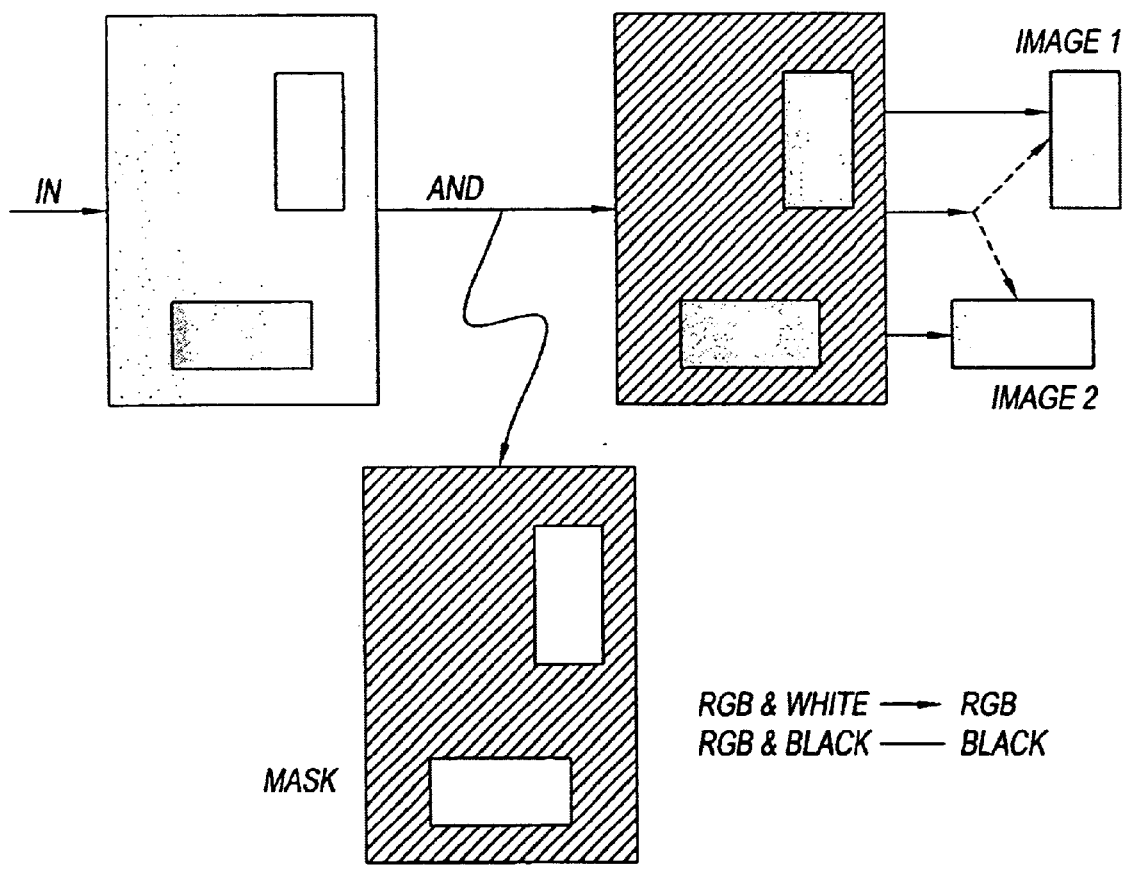
FIG. 17 shows another example of atomic operation used in the method according to the present invention.

A further useful atomic operation on image data is the AND function, shown schematically in FIG. 17. In particular, after the recognition of the colorfulness content of each pixel and the blobbing of the image data, the singular images in the processed document can be separated by means of an AND function of such data and a mask, duly created on the basis of the following relationships:

RGB AND WHITE=RGB
RGB AND BLACK=BLACK.

IMAGE1 and IMAGE2 can be described as regions, identified by coordinates and dimensions.

A sub-mask can be associated to each region to filter significant and insignificant data, as shown schematically in dotted lines in FIG. 16.

Figure 18A:
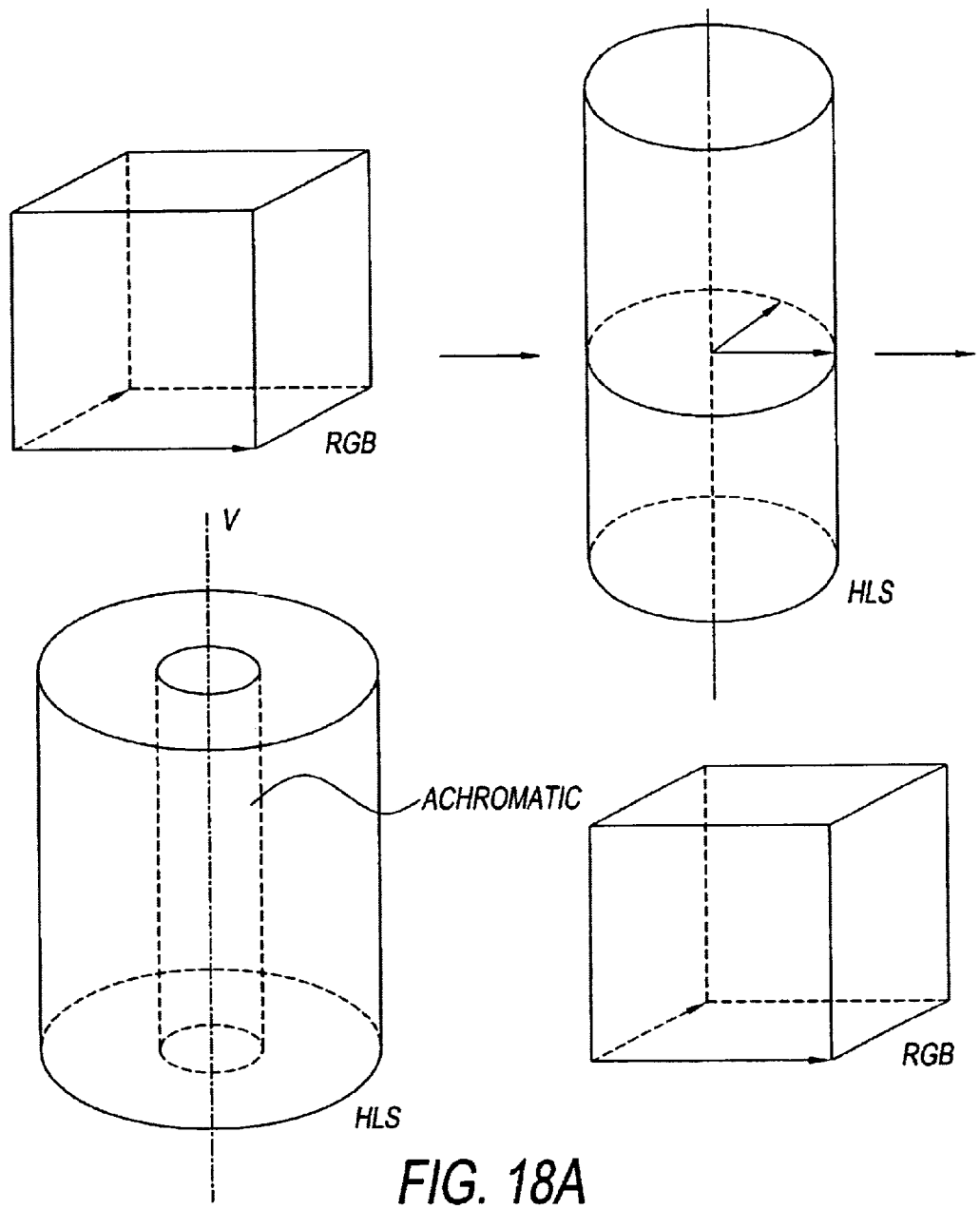
FIGS. 18A and 18B show another example of atomic operation used in the method according to the present invention and its implementation.

Finally, another known atomic operation that can be used in the HLS space (or equivalent) is the filtering of achromatic portions, as shown in FIG. 18A, by means of a sub-cylinder section (ACHROMATIC) of the HLS color space.

Figure 18B:
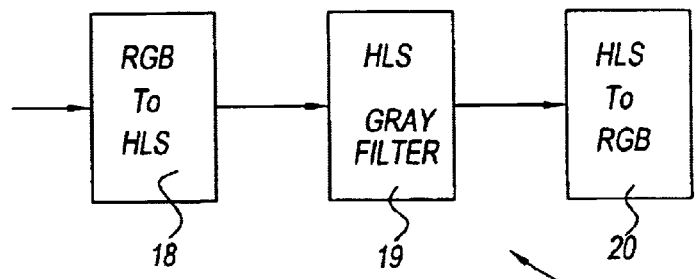

FIG. 18B shows schematically a filter 17, according to the above filtering function. The filter 17 comprises a RGB to HLS converter 18, connected to an HLS gray filter 19 and to a HLS to RGB converter 20.

According to the present invention, starting from a "flat" data sheet (the pixels' raster) a multi-layer representation is obtained. Moreover, using a dynamic pipeline, i.e. the collection of elementary functions and their links as above defined, output data having any kind of format are obtained.

A configurable image processing device 21 according to the present invention comprises three major subsystems:
1. the unit of processing called "transforms";
2. the unit of work called "packets";
3. the unit of transportation called "ports".

With this three component, the device provide for transformations of image data, connections between the transforming units, and independent data representation.

In particular, transforms process data in a context independent fashion, that being there is not implied knowledge coupled between transforms influencing the means of process data. Moreover transforms support multiple input and output capabilities through a port mechanism.

In other words, transforms perform atomic operations on the data presented through a packet mechanism.

Moreover, ports provide a communication protocol between processing units. The actual port protocol ranges from direct function call invocation, to operating system message queue/mail box protocols, to remote procedure invocations, as well as http links.

Finally, packets provide the encapsulation of data. Data can represent actual image data in a variety of different formats, histogram information, compression data, local grouping of data without requiring any impact to other components. By isolating the data into the packet mechanism data can be represented in the most efficient fashion for transportation or transformation without impacting either the transforming units or the means of data transportation.

The configurable image processing device 21 and its three major subsystems isolate the means whereby data is transported around the system. By doing so, an image data processing pipeline is distributed in a transparent fashion, not influencing any other component within the image processing system.

In fact, the configurable image processing device 21 according to the present invention, select a particular group of atomic operations to be performed on the basis of the final device receiving the output data. By doing so, the device "create" a specific pipeline providing the required transformation of data.

Figure 19A:
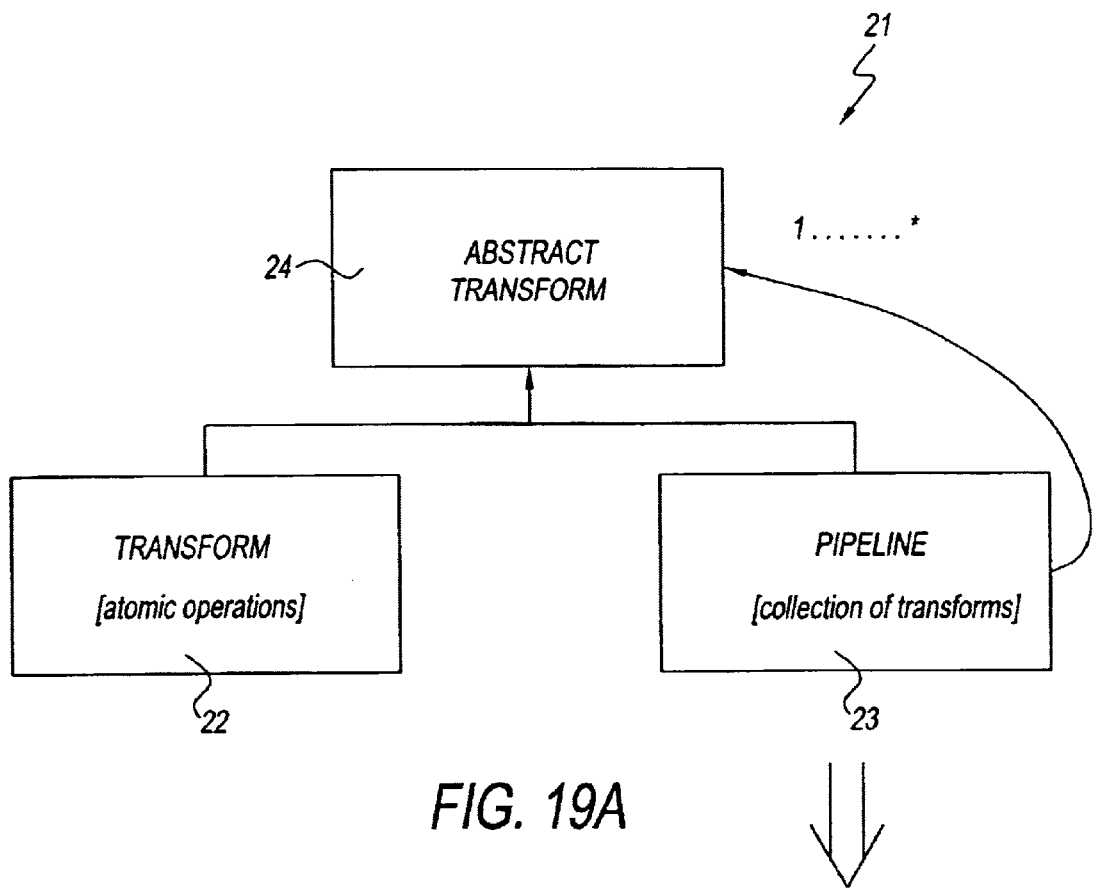
FIG. 19A shows schematically and functionally an image data processing device according to the present invention.

A functional and schematic representation of the configurable image processing device 21 is shown in FIG. 19A. The device 21 comprise a selector 22 of the particular group of atomic operations for a final device and a pipeline 23, that establishes the order and links between such atomic operations.

In FIG. 19A is also shown a final reconstruction block 24, that process the results of the selector 22 and the pipeline 23 in order to obtain the desired output layer of data.

Figure 19B:
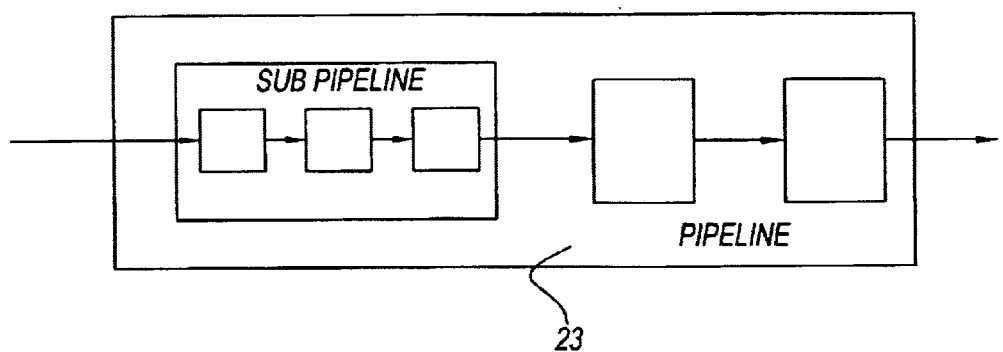
FIG. 19B shows more particularly a detail of FIG. 19A.

It should be noted that the pipeline 23 can also comprise sub-pipelines, in a more and more complicated structure, as shown in FIG. 19B.

Advantageously, according to the present invention, each pipeline generates a layer, i.e. a specific data organization. In this way, pipelines are created through a meta-data level of knowledge. Since a pipeline itself is an independent structure of different atomic operations and their links, there is no inherent knowledge incorporate in the hardware components of the image data processing device to convey the meaning/context of how the pipeline is to be applied.

In other words, the effect of the pipeline is captured in how the atomic components are connected through ports and the data is transported and transformed. This meta-level of context is outside of the context implicitly provided by the components themselves; this task is left to the application that define and drives the dynamic pipeline.

Advantageously, according to the dynamic pipeline as above defined, at any given moment there is never a static definition of the meaning of the pipeline itself. The context is represented in a meta-level definition that can be altered during run-time execution and can be reconfigured/rewired during the lifetime of the product even after the product has frozen "bits" and entered the marked.

Finally, it is pointed out that a particularly useful application obtained from a dynamic pipeline according to the present invention deals with two particular layers of output data, i.e. the BW and color layers, needed in the increasely used PDF representation.

Figure 20:
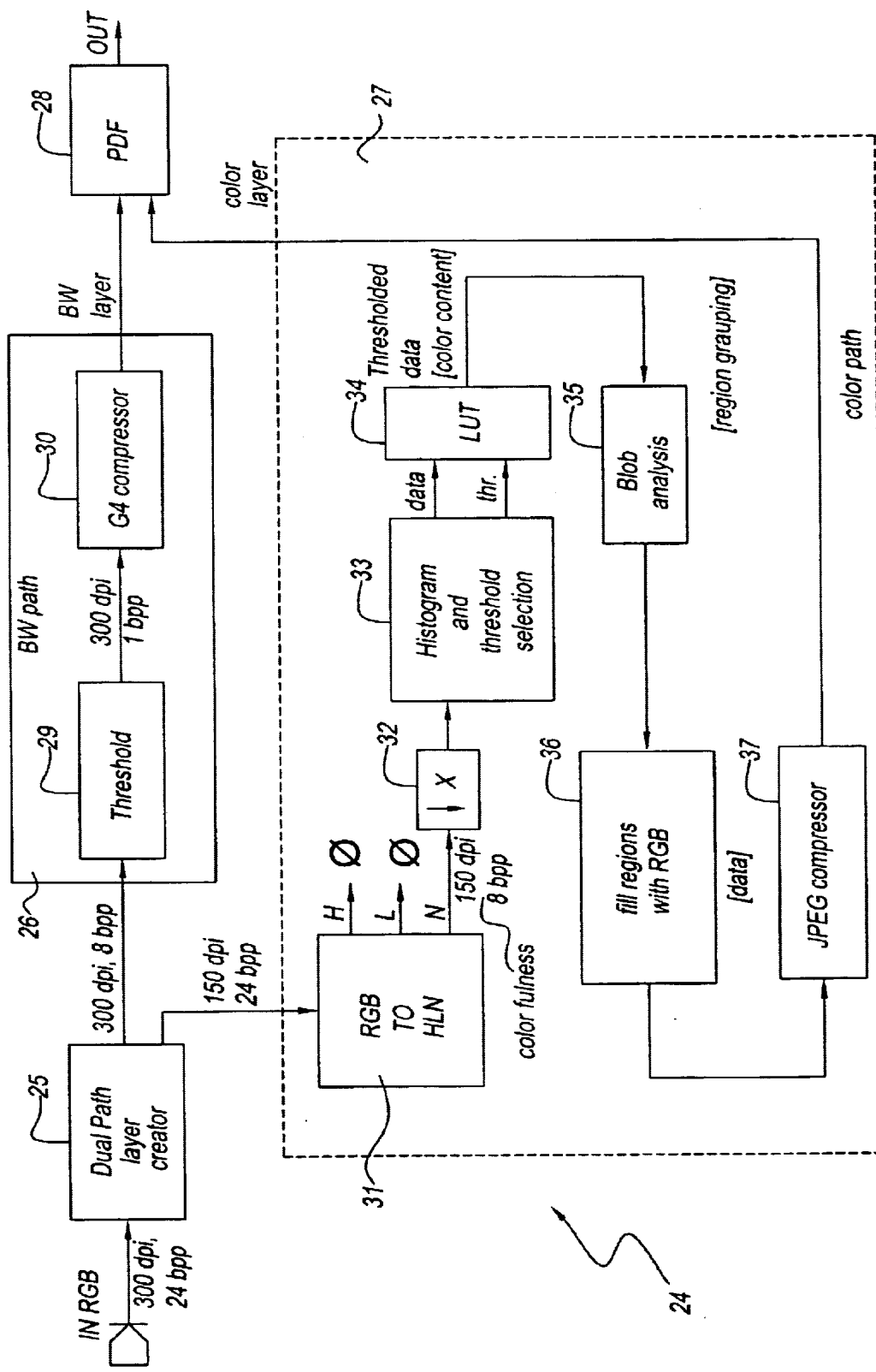
FIG. 20 shows more particularly a PDF application of the method according to the present invention.

A data processor 24 for obtaining processed color and BW layers is shown more precisely in FIG. 20.

The data processor 24 has an input IN that receives the raster image data, for example in the RGB format, and is connected to a dual path layer creator component 25, which in turn outputs a first and a second layer, such layers having different data compression rate.

The first layer is inputted in a BW path 26 that outputs a processed BW layer. In a similar manner, the second layer is inputted in a color path 27 that outputs a processed color layer. The processed BW and color layers are finally inputted in a PDF device 28.

More particularly, in the example shown in FIG. 20, the BW path 26 comprises a threshold block 29 connected in series to a compressor 30. A G4 compression is often used in the field of BW image data processing.

Moreover, also in FIG. 20, the color path 27 comprises a RGB to HLN converter 31, having the output N channel connected to a series of a down scale device 32, an histogram and threshold selector 33, a look-up-table 34, a blob analysis block 35, a fill regions block 36 and a compressor 37. A JPEG compression is often used in the field of color image data processing.

While it has been designed for embedded scanner applications, the configurable image processing device according to the present invention is platform independent as it can also operate on a personal computer or in a work station environment.

There are several advantages of the image data processing method and device according to the present invention:
1. The meta-level contextual knowledge used by the processing method and device is not hard coded into the physical implementation of the dynamic pipeline.
2. The individual processing units/transforms as above defined can be realized in hardware, firmware, or software components to exploit capability of device.
3. The transportation of data is de-coupled and inherent transparent to the intent/purpose of the pipeline itself.
4. The dynamic pipeline is completely self-contained, and its representation can be saved in whole or in part, so that context/state can be saved/replayed.
5. The processing method leads to parallel, distributed solutions across any number of platform combinations.
6. New transformations can be added after the product has been shipped through special code extending applet transform.
7. The data representations can be shared on local copies of memory structures.

What is claimed is:

1. An image data processing method receiving an input image data split into elementary units of information that provides an output image data with a particular image format depending on the requirements of a final device receiving such output image data, comprising the following steps:
   1) identifying the final device which receives the output data;
   2) getting the input image data;
   3) from a repository of basic imaging operations selecting a plurality of operations to be performed on said input image data;
   4) creating a sequence of operations that links and ordinate said plurality of operations;
   5) applying said sequence to the input image data, to create a plurality of layers of organized data of said input image data;
   6) assembling said plurality of layers into at least an output layer which best fit the requirements of the identified final device; and
   7) sending said assembled output layer to the identified final device.

2. An image data processing method according to claim 1, wherein in said steps 3 to 5, each sequence yields to an unique result.

3. An image data processing method according to claim 1, wherein steps 5 and 6 specify, for each layer, what does it mean and what/how to process the input image data within.

4. An image data processing method according to claim 1, wherein said repository comprises a compression function comprising in turn the G4 and JPEG compression methods.

5. An image data processing method according to claim 1, wherein said repository comprises an AND function used in combination with a black & white mask.

6. An image data processing method according to claim 1, wherein said repository comprises a re-mapping function selecting a portion of the input image data and distributing or re-scaling the information contained in such portion over the all image data space.

7. An image data processing method according to claim 6, wherein the content of the input image data is concentrated in said selected portion.

8. An image data processing method according to claim 1, wherein said repository comprises a thresholding function comprising in turn the following steps:
   calculation and extraction of an indicator of colorfulness of each pixel from the input data;
   selection and classification of output data on the basis of a threshold value or a rule for the colorfulness indicator.

9. An image data processing method according to claim 8, wherein an elementary unit of information of output data is considered ON if the colorfulness indicator of the corresponding elementary unit of information of the input data is above the threshold value and OFF if it is lower than the threshold value.

10. An image data processing method according to claim 9, wherein if the elementary unit of information is considered OFF said elementary unit of information is reproduced in black and white.

11. An image data processing method according to claim 8, wherein said threshold value is a fixed value.

12. An image data processing method according to claim 8, wherein said thresholding function uses a histogram of the color content of a processed document page in order to decide what the best threshold value for the document is.

13. A configurable image processing device to read and output an image data comprising input means to get an input image and output means for providing a particular output format depending on a final device that receive such output image data, selection means to select a particular group of atomic operations to be performed on the basis of said final device performance, so creating a specific sequence providing meaningful information for the selected device, and a sequence of basic operations providing for re-mapping architecture, wherein said re-mapping architecture comprises a RGB to HLS converter, connected to an HLS to RGB converter, by means of a series of an HLS filter and a stretch block.

14. A configurable image processing device to read and output an image data comprising input means to get an input image and output means for providing a particular output format depending on a final device that receive such output image data, selection means to select a particular group of atomic operations to be performed on the basis of said final device performance, so creating a specific sequence providing meaningful information for the selected device, and a sequence of basic operations providing for a re-mapping architecture, wherein said re-mapping architecture comprises a RGB to HLS converter having a plurality of output channels, only one of said output channels being connected to series of a filter and a stretch block, the re-mapping architecture further comprising an HLS to RGB converter receiving the original channels as outputted from the RGB to HLS converter and the channel as processed by means of said filter and stretch block.

* * * * *